United States Patent [19]
Broe

[11] Patent Number: 5,927,598
[45] Date of Patent: Jul. 27, 1999

[54] ENERGY MANAGEMENT METHOD AND APPARATUS

[75] Inventor: Thomas Kenneth Broe, Calgary, Canada

[73] Assignee: WeXL, Calgary, Canada

[21] Appl. No.: 08/847,412

[22] Filed: Apr. 23, 1997

[51] Int. Cl.$^6$ ............................. H02J 1/00; G05D 23/00
[52] U.S. Cl. ........................... 236/46 R; 236/47; 307/39; 323/208
[58] Field of Search ............................. 236/47, 51, 46 R; 307/39; 323/208

[56] References Cited

U.S. PATENT DOCUMENTS

| | | | |
|---|---|---|---|
| 3,987,308 | 10/1976 | Burch | 307/41 |
| 4,153,936 | 5/1979 | Schmitz et al. | 364/493 |
| 4,168,491 | 9/1979 | Phillips et al. | 307/39 X |
| 4,293,915 | 10/1981 | Carpenter | 364/493 |
| 4,335,320 | 6/1982 | Garver | 307/39 |
| 4,554,502 | 11/1985 | Rohatyn | 323/208 |
| 4,695,738 | 9/1987 | Wilmot | 307/39 X |
| 5,318,224 | 6/1994 | Darby et al. | 236/47 |
| 5,426,620 | 6/1995 | Budney | 368/10 |
| 5,544,036 | 8/1996 | Brown et al. | 364/145 |
| 5,572,438 | 11/1996 | Ehlers et al. | 364/492 |

*Primary Examiner*—William Wayner
*Attorney, Agent, or Firm*—John Russell Uren

[57] ABSTRACT

An energy management system designed to reduce the costs of electrical energy particularly applicable to service businesses such as restaurants, service stations, convenience and grocery stores and the like. The system includes controllers to sequentially and in a predetermined manner initiate operation of a plurality of loads such as appliances and other devices thereby to reduce the demand rate for electricity. A plurality of operating modes are designed for the particular loads or devices and determine the quantity of energy needed under various operating conditions, the operating modes consuming reduced power and generally being associated with a duty cycle. A capacitance bank is associated with those loads having motors to increase the power factor when the motors are under operation. A timer may automatically initiate and terminate operation of the motor and the associated capacitance bank. The devices may be independently controlled or combined with other loads as the operating conditions of the establishment may dictate.

19 Claims, 5 Drawing Sheets

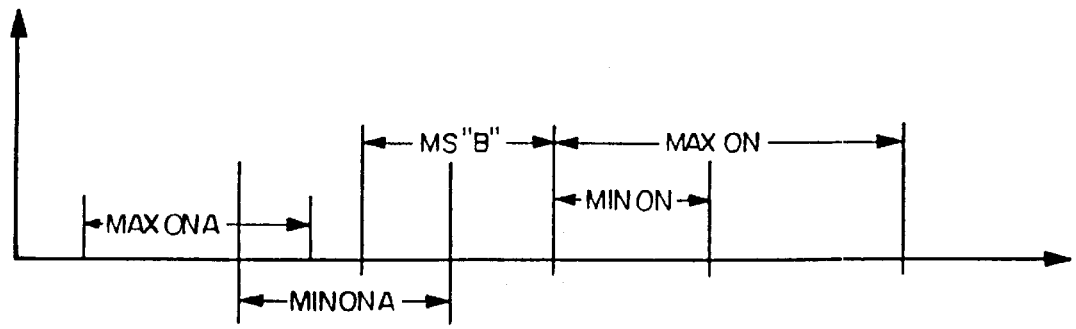

1. DEVICES IN GROUP A ON. GROUP B DEVICE REQUESTS ON STATUS.
2. MICROCONTROLLER ("MC") SETS GROUP B "MUST START" TIMER. MC ALSO INHIBITS ANY OTHER GROUP A DEVICE FROM TURNING ON.
3. DEVICES IN GROUP A PERMITTED TO RUN UNTIL GROUP B "MUST START" TIMER EXPIRES. GROUP A THEN TURNED OFF, PROVIDED GROUP A "MINIMUM ON" TIMER AT ZERO. GROUP B THEN TURNED ON.
4. MC SETS GROUP B "MINIMUM ON" TIMER AND GROUP B "MAXIMUM ON" TIMER.

FIG. 3A

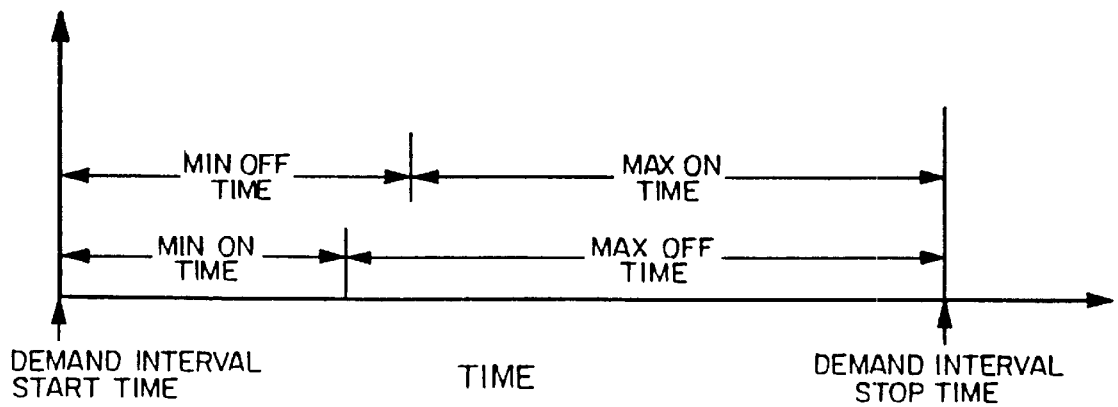

THE MINIMUM OFF ("MIN OFF") AND MINIMUM ON ("MIN ON") TIMES DETERMINED BY CHARACTERISTICS OF SPECIFIC DEVICES CONNECTED TO MICROCONTROLLER ("MC")

FIG. 3B

IF MEASURED CONSUMPTION EQUALS PEAK DEMAND THRESHOLD DURING PEAK DEMAND MONITOR PERIOD, DEVICE IS TURNED OFF FOR REMAINDER OF PERIOD AND MIN OFF TIMER INITIATED.

ENERGY MANAGEMENT METHOD AND APPARATUS

INTRODUCTION

This invention relates to an energy management system and, more particularly, to an energy management system for use in various service industries, such industries including restaurants, service stations, convenience and grocery stores and the like.

BACKGROUND OF THE INVENTION

Electric utility companies charge users on a three pronged basis. First, the demand rate is determined; that is, the greatest demand for electricity required by the user over a specific period of time, typically a fifteen(15) minute period, is determined. For example, if several electrical devices in the form of appliances or other loads come on line simultaneously and all draw power over the fifteen(15) minute period, the demand is high and electrical utility companies charge in accordance with the highest demand incurred that entire month or year depending on the utility. If the demand rate is smaller, the rates are lower and concomitantly, the electricity cost is lower for the same amount of energy consumed but which is consumed over a longer time period. Second, the total consumption of electricity is determined by the electric utility. If total consumption of electricity is smaller, electric utility costs will be lower as is well known. Third, the power factor of loads which utilise motors, such as refrigerators, freezers, heating, air conditioning and ventilating ("HVAC") equipment and the like is of interest as is the type of meter used to measure such inductive loads. Utility companies take the view that most motors have a power factor of about 0.64 which is not unreasonable if there is no attempt to increase the power factor and if the user is a relatively small user of electrical power. The power measured at the meter is the power rating of the motor divided by the power factor. If the power factor is close to unity, the lower the power measured at the meter and the lower the cost of power. If the user can show that its power factor is between 0.9 and 1.0, electric utility companies will generally negotiate a lower rate for supplied electricity thereby resulting in lower costs. A particular disadvantage to the utility customer results if the meter measuring the reactive power associated with motors is a thermal type meter.

In restaurants, gas stations and convenience and grocery stores, electrical power consumption is relatively high and the three factors described above for use in determining electric power costs are particularly disadvantageous for the user. This is so because, first, it is often the case that several loads, appliances or other devices commence operation and draw power simultaneously such as will happen, for example, when the manager of such a business commences the operation of several loads and other devices when the establishment is initially opened in the morning. Such activities include switching on coffee makers, toasters, heating, ventilating or air conditioning units ("HVAC") and food heaters simultaneously. Thus, the demand rate is very high at this particular period and this high demand rate which will extend generally for at least the fifteen(15) minute demand period which then sets the rates charged by the electrical company to the customer for electric power over an entire month or year of consumption. It may and usually is unnecessary to have this high demand. Thus, the simultaneous operation of many different loads, particularly at their full power settings, is disadvantageous.

Secondly, motors under operation contain high inductance and the use of motors can result in low power factors. For example, a restaurant may contain several walk-in freezers/coolers or refrigerators/coolers used to freeze or display food items for customers and to maintain food for preparation. HVAC equipment likewise contains motors for compressors and fans. The use of such motors for running compressors or otherwise causes the voltage to lag the current by an amount that is quantified as the power factor. A low power factor is disadvantageous for the user who pays unnecessarily high electricity rates for using such motors. This disadvantage is particulary pronounced when the reactive power is measured by a thermal type meter.

Thirdly, restaurants are inefficient users of electricity. Continuously operating toasters, coffee machines, pizza ovens, food warmers and the like draw high power when no toast or food is being prepared. Such high power use is unnecessary, disadvantageous and costly.

An energy management system is disclosed in U.S. Pat. No. 5,572,438 (Ehlers et al) and assigned to TECO Energy Management Services. This reference is primarily oriented towards energy conservation and control information being provided to the user and not to automatic energy consumption reduction by a plurality of loads at the location of the consumer. Ehlers et al teach a communication technology preferably using power-line carrier (PLC) technology between a control computer located at the facility and a utility meter at the user's location. Such technology is not a principal concern of the applicant since control of energy consumption by the utility supplying such energy is not a material aspect of the present invention.

SUMMARY OF THE INVENTION

According to one aspect of the invention, there is provided an energy management system for a plurality of loads comprising a controller operably connected to said loads for monitoring the energy consumed by and controlling the operation of said loads, said controller designating one of at least two modes of operation for each of said loads, one of said modes of operation being an active mode wherein said energy consumed by said load is at a first value and one of said modes being a standby mode wherein said power consumed by said load is at a second value, said first value being higher than said second value.

According to a further aspect of the invention, there is provided an energy management system for a plurality of loads comprising a controller operably connected to said loads for monitoring the energy consumed by and controlling the operation of said appliances, said controller designating one of at least two modes of operation for each of said loads, said modes of operating being an active mode wherein said energy consumed by said load is at a first value and a standby mode wherein said energy consumed by said load is at a second value, said first value being higher than said second value, said controller further being operably connected to a sensor for sensing the intended energy consumption of said loads, said sensor determining said mode of operation of said loads.

According to yet a further aspect of the invention, there is provided a method of conserving energy for a plurality of loads drawing energy comprising assigning at least two operating modes to at least one of said loads, said first operating mode being an active mode wherein said load draws energy at a first value, said second operating mode being a standby mode wherein said load draws energy at a second value, said first value being higher than said second value.

According to yet a further aspect of the invention, there is provided an energy management system used for a plurality of loads, at least one of said plurality of loads having a motor and a capacitance bank for said motor to increase the power factor of said motor of said at least one load.

According to yet a further aspect of the invention, there is provided a method of conserving energy for a natural gas fuelled load comprising supplying natural gas to said load through a solenoid operated valve and applying one of two predetermined fuel supply modes to said load, said first of said two predetermined fuel supply modes being an active mode with said fuel being supplied at a first rate and said second of said two predetermined fuel supply rates being a standby duty cycle wherein said fuel is supplied to said load at a second rate, said second rate being lower than said first rate.

According to still yet a further aspect of the invention, there is provided an energy management system comprising a load having a motor, a capacitance bank operably associated with said motor and a timer operatively connected to said motor, said timer allowing said capacitance bank to be operably connected with said motor while said motor is under operation and said timer requiring said capacitance bank to be disconnected from said motor while said motor is not in operation.

BRIEF DESCRIPTION OF THE SEVERAL VIEWS OF THE DRAWINGS

Specific embodiments of the invention will now be described, by way of example only, with the use of drawings in which:

FIGS. 3A, 3B and 3C are diagrammatic graphical views of the sequencing used to initiate operation and maintain and terminate operation duration of various of the loads of FIG. 1.

DESCRIPTION OF SPECIFIC EMBODIMENT

Figure 1:
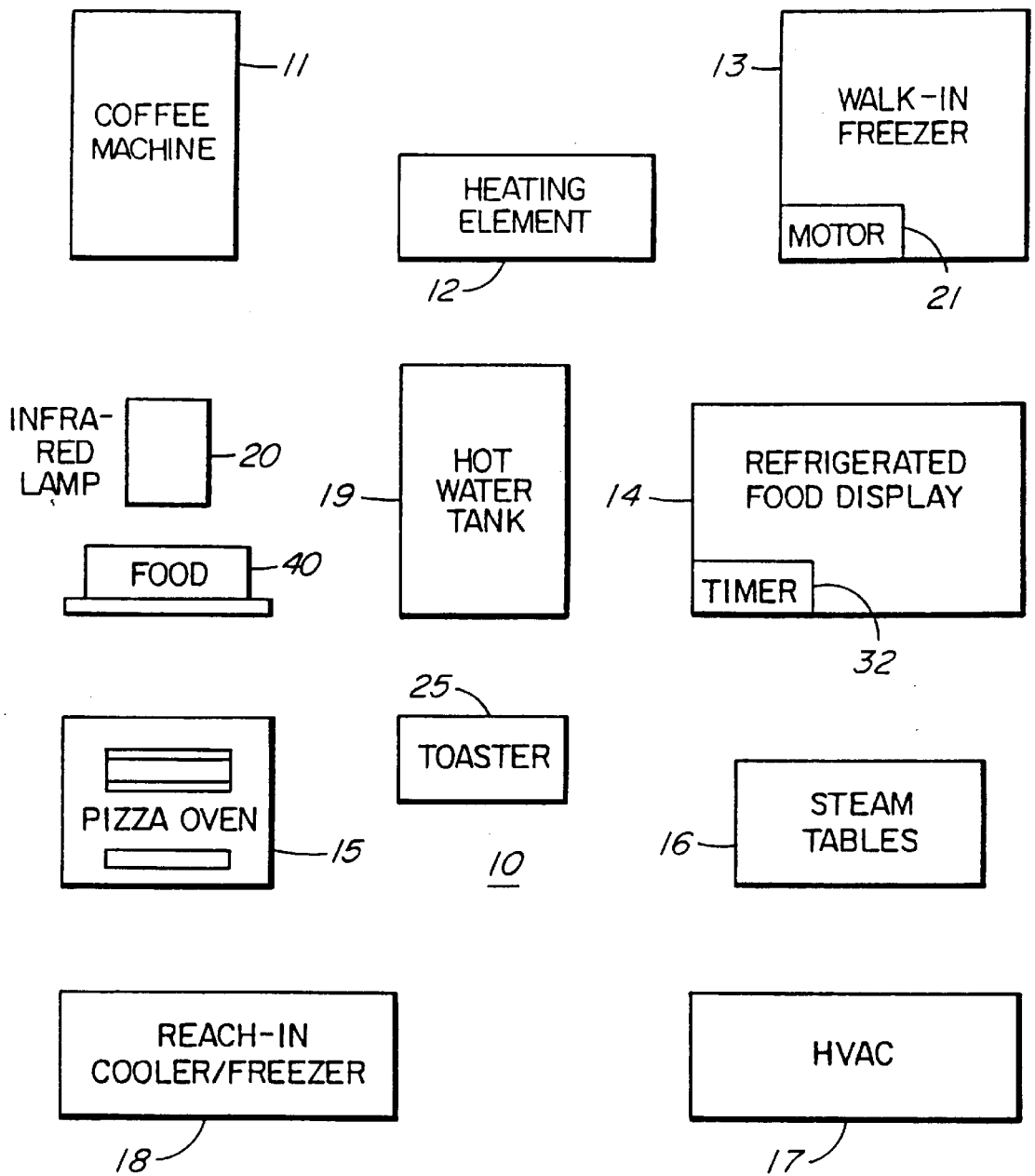
FIG. 1 is a diagrammatic view illustrating typical appliances, devices and other loads used in a restaurant operation which each utilise electrical power as contemplated by the invention, the loads being inductive or resistive loads.

Referring now to the drawings and particularly to FIG. 1, a plurality or bank of electrical devices and other loads is illustrated generally at 10, which devices or loads 10 are typically used in a restaurant although it will be understood the loads could also be representative of other situations. The appliances and loads 10 include coffee machine 11, heating element 12 used to prepare heated food items, freezer/cooler 13 of the walk-in variety to store perishable items, reach-in cooler/refrigerator 18 used to store preparation food, display refrigerator 14 typically used to display foods such as juices, soft drinks, sandwiches, etc., at a lower temperature to maintain freshness and flavor, pizza oven 15, hot water tank 19, toaster 25, infrared heating lamp 20 used to maintain prepared food items at a desired temperature prior to being transported to the customer and steam table 16 used to prepare food items or maintain them at appropriate temperatures. The coffee maker 11 is contemplated to be the usual commercial type with removable carafes positioned on heating elements, which carafes are filled from time to time as the coffee is consumed. Toaster 25 is contemplated to be of the endless grill type with a grill moving under a heated element. The grill holds the toast and moves it under the element for a predetermined time period. Each of the devices 10 draws power from a source of electric power, typically an electrical utility company although certain loads like pizza oven 15 and steam table 16 may also be fueled by natural gas or heating oil. It will be appreciated that there may be more loads drawing energy in addition to those illustrated in FIG. 1. Such additional loads would include heating, ventilating and air conditioning units 17 ("HVAC"). Additionally, it will be understood that there may be a plurality of coffee makers, toasters, infrared heaters and the like depending upon the size of the restaurant.

The bank of electrical appliances and loads 10 generally operate in the following manner. When the day commences, the manager of the restaurant will immediately commence operation of coffee machine 11, the heating element 12 used to prepare hot food, the toaster 25 and the infrared light 20 used to maintain the food prepared from the heating element 12 at the desired consumption temperature. Likewise, the operation of the heating and/or air conditioning and ventilating loads 17 will be initiated or already be drawing power. The walk-in freezer 13 will typically have been kept at a desired temperature overnight and with the entry of the user to obtain and remove food for preparation, the compressor (not illustrated) running from motor 21 will commence operation to maintain the desired temperature inside the walk-in freezer 13 in view of the cool air escaping with the entry and egress of the user. Likewise, the motor 32 used with the compressor (not illustrated) of the refrigerated food display 14 will commence operation since the temperature of the food display 14 would likewise otherwise increase outside the specified range with the opening and closing of the refrigerator 14 to remove and replace food items. The pizza oven 15 may also be drawing energy since it may be kept continuously hot. This is so because the necessary operating temperatures take a lengthy period to reach.

Accordingly, many of the loads illustrated and others may be initiated and operating simultaneously upon the opening of the restaurant. This simultaneous operation creates a large initial demand for electricity. Such demand over a typical demand period of fifteen(15) minutes is measured by the utility company and thereby sets the demand rate for the user imposed by the utility for monthly or annual billings.

Figure 2:
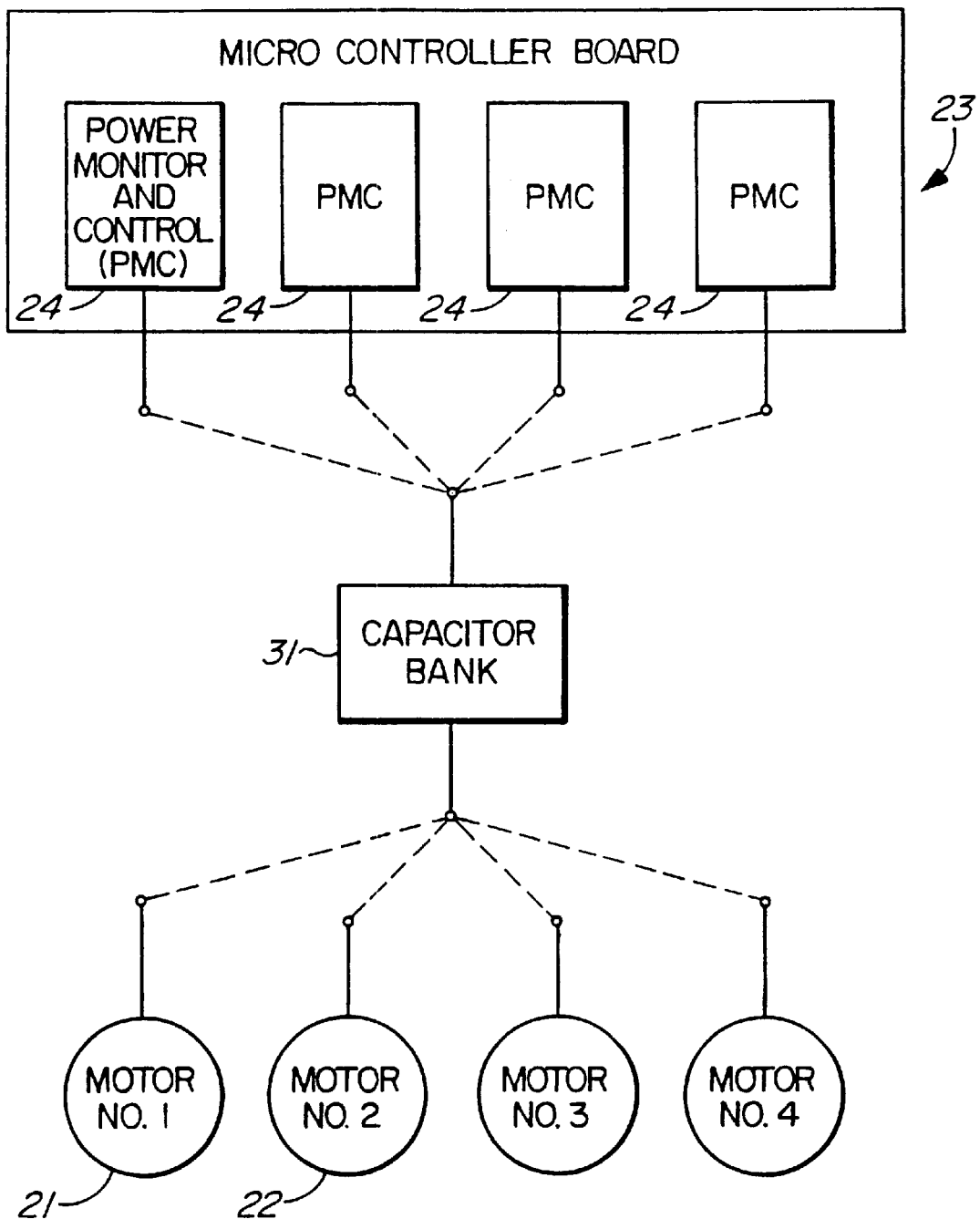
FIG. 2 is a diagrammatic block diagram of the controller used according to the invention to increase the power factor of the motor driven loads of FIG. 1.

With reference now to FIG. 2, a controller is generally illustrated at 23. It comprises a plurality of power monitor and control("PMC") elements 24, each connected to an individual one of the devices or loads 10 illustrated in FIG. 1.

A capacitor bank 31 is connected between the motor 21 of walk-in freezer 13 and motor 22 of refrigerator 14. The capacitor bank 31 allows the power factor of the motors 21, 22 to be brought closer to unity when the motors 21, 22 are in operation. It will be understood that although only two(2) motors 21, 22 are disclosed and illustrated, such disclosure is for purposes of assisting explanation and that additional motors and other loads could be used in accordance with the teachings of the invention.

The capacitor bank is required to respond to the following conditions:

|  | PMC OFF | PMC ON |
| --- | --- | --- |
| Load Off | Cap.Bank Off | Cap.Bank Off |
| Load Inductive On | Cap.Bank Off | Cap.Bank On |
| Load Resistive On | Cap.Bank Off | Cap.Bank Off |

The controller 23 senses when a load is on-line and operating in a mode where power factor correction is required. Some loads may have more than one operating mode, not all of which would require power factor correction. For example, a load corresponding to walk-in freezer 13 or reach-in cooler 18 might operate in a defrost mode. the defrost mode will not require power factor correction. Alternatively, the freezer 13 and cooler 18 may operate in a chill mode which requires power factor correction. The need for power factor correction is evaluated by monitoring power factor and the appropriate amount of capacitance is engaged to bring power factor closer to unity. When the PMC turns off, or the load is removed or its operating mode changes, the capacitor bank 31 senses the power factor change and disconnects itself from the circuit. This prevents the capacitor bank 31 from creating a leading power factor thereby undesirably increasing the electrical cost. It also permits the capacitor bank 31 to be a stand alone device in certain applications when no monitoring or control is either required or desired.

Figure 4:
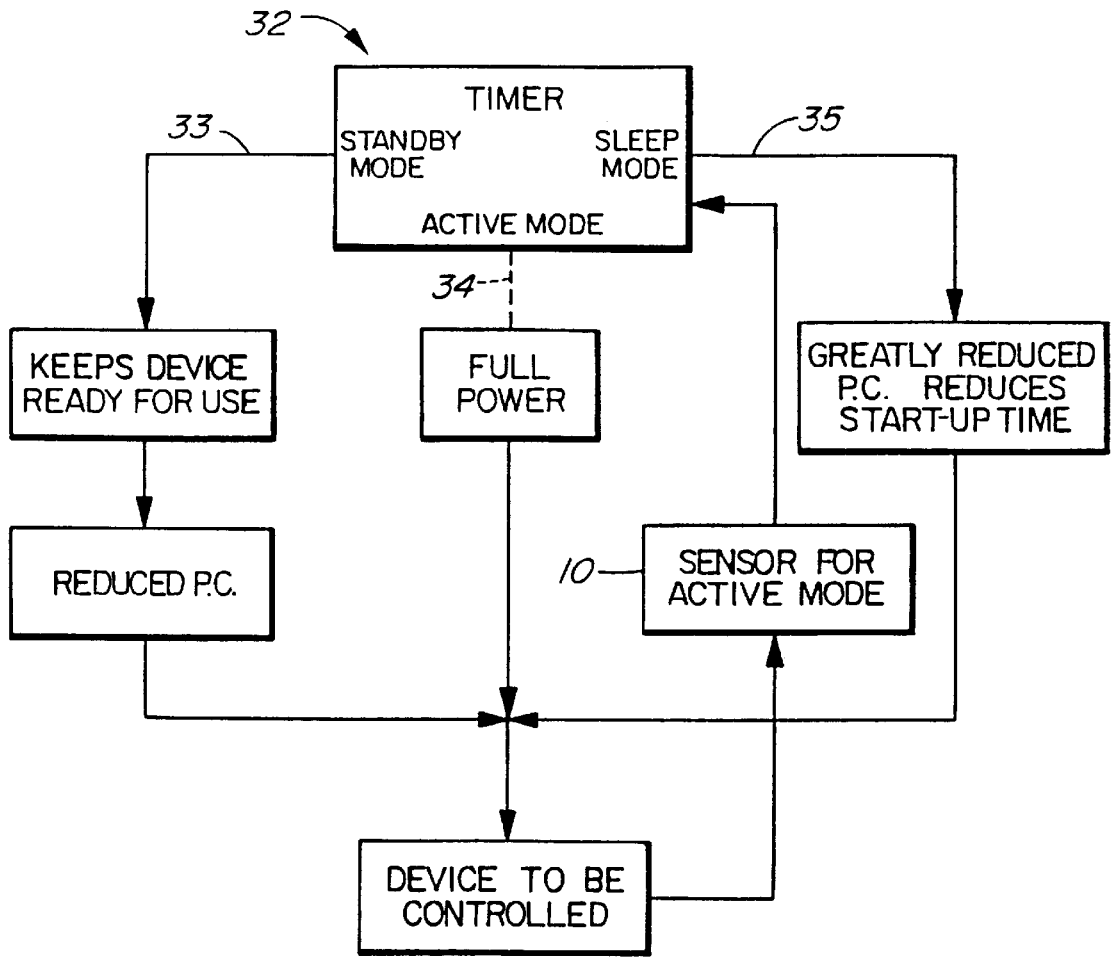
FIG. 4 is a diagrammatic view of the timers used for the various operating modes according to the invention which are also applicable to various of the devices illustrated in FIG. 1 and which may not require a controller.

A representative passive timer is generally illustrated at 32 in FIG. 4 and may be used without a controller 23. The timer 32 is operable to maintain a device or load within one of three(3) modes, namely standby 33, active 34 and sleep modes 35. A control mode (not illustrated) requires one or more devices to be off when required. The standby mode 33 is intended to maintain the appliance at a reduced power level but available for use when required. For example, the infrared light 20 illustrated in FIG. 1 would be maintained at a lower power level by the timer 32 in the standby mode.

The lower power levels, particularly the standby and sleep modes 31, 35 respectively, generally require that the device be operated within a duty cycle. The duty cycle is an on-off cycle; that is, when the device is in the standby mode of operation, the device may be cycled on and off at a first rate thereby to reduce power consumption. The time the load is off is determined by the characteristics of the load being controlled and the characteristics of the medium to which the load is applied. The standby and sleep modes 33, 35 are further beneficial for the longevity of the life of the consuming device. This is so since thermal shock in initiating operation of the device is reduced when the device is already drawing some power thereby bringing the device closer to operating temperature.

As an example of the standby mode, when a food item 40 is placed under the infrared light 20 as seem in FIG. 1, a sensor will sense the presence of a food item 40 and the light 20 will immediately turn on and assume an active or full power mode 34 thereby providing full power and maintaining the food item 40 at the desired temperature. When the food item 40 is removed, the standby mode 33 and its duty cycle may again be entered.

The full power mode 34 is used when the appliance is required to be operated as intended prior to the incorporation of the invention with the operation of the appliance. For example, the infrared lamp 20 will operate at full power thereby providing heat to the food item 40 placed beneath the lamp 20. Likewise, the coffee maker 11 will operate in a coffee creating mode with maximum power being used to heat the water within the coffee maker 11 as it makes coffee. No duty cycle is associated with the full power mode 34.

The sleep mode 34 is intended to have a lower duty cycle than the standby mode 33 and requires a set period of time before normal operation of the load or device can commence. For example, a hot water tank 19 (FIG. 1) may be maintained in the sleep mode overnight when the temperature of the water can be reduced some 10–15% without affecting the availability of hot water when the restaurant opens. Likewise, the HVAC equipment may also be maintained in standby or sleep modes. In the sleep mode, the duty cycle will typically be 25%; that is, power will be drawn by the hot water tank 19 25% percent of the time and the hot water tank 19 will be off 75% of the time. As morning begins and the restaurant approaches its opening time, the sleep mode may change to the standby mode which is typically associated with a 50% duty cycle meaning that power will be drawn 50% of the time and the device will be off 50% of the time thereby to move the appliance closer to its full operating condition.

The passive timer also has a "control" mode of operation. The control mode is intended to organize and prioritize the operation of the loads, appliances and other devices in such a manner to ensure that only a minimum number of devices are energized simultaneously which will thereby reduce demand. Each of the devices 10 is assigned a priority value. Devices that must be energized have a priority value greater than devices in which the time of energization is not important. Thus, high numbered priority devices would be earlier energized than lower priority devices. For example, an operator may want the toaster 25 to have operating priority over a base board heater in a hallway of the restaurant. Thus, the base board heater would be de-energized when the operation of the toaster 25 is initiated. When the toaster has finished its cycle, the base board heater would be re-energized. Typically, one device would have priority over several other devices.

OPERATION

Figure 3C:
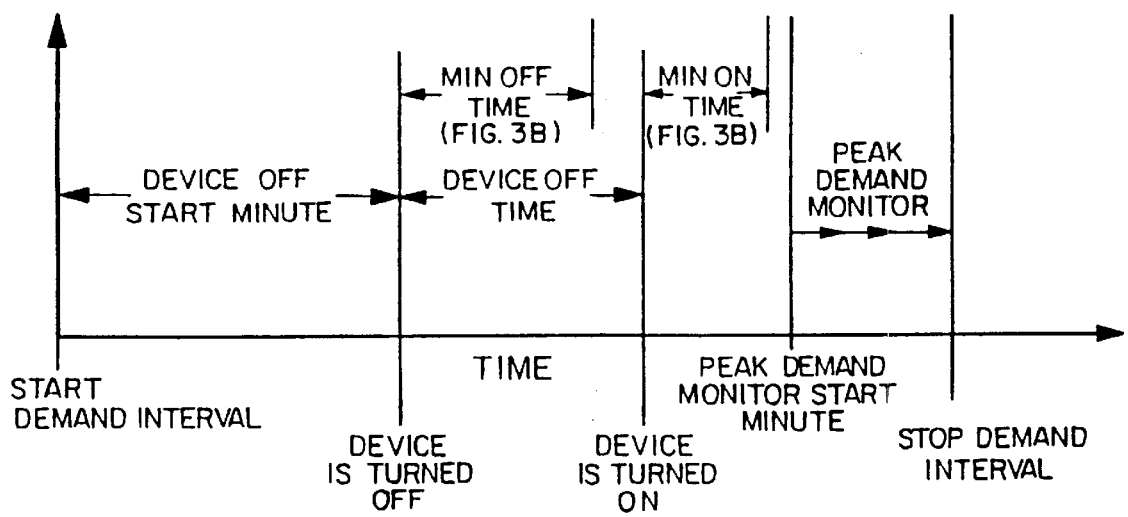

With reference to FIGS. 1 and 3, it will be assumed that the manager initially enters the restaurant in the morning. He will initiate operation of the coffee maker 11, heating elements 12, toaster 15, infrared lamp 20 and other of the devices 10 by switching each of the devices on so that they assume their full power or active operating mode 34 (FIG. 4). Simultaneously, he may enter and exit the freezer 13 and he may open and close the refrigerated food display 14 to obtain and place food items therein. He may also initiate operation of various items of HVAC equipment, such as a baseboard or other type of heater (not illustrated) or air conditioner, depending on the time of year. He may also initiate operation of the chimney fans to draw fumes away from the food preparation area.

With reference to FIG. 2, the controller 23 is connected to each of the appliances or loads 10 such as hot water tanks 19, steam tables 16, walk in freezer/cooler 18, reach-in cooler/freezer 18 and heating ventilation and air conditioning devices 17 and other of the devices 10. Such devices are referred to as active devices because they may turn themselves on and off without human intervention. The power monitor and control devices ("PMAC") 24 are then coordinated such that a minimum number of devices are on at a given time while permitting each device sufficient on-time to complete its task. This results in the demand rate being less.

The rates are thereby lower and concomitantly, the electricity cost is lower for the same amount of energy consumed.

The controller 23 will be connected to each of the active devices or loads 10. An active appliance or load 10 is defined as a device which can turn itself off or on as a result of a changed parameter. For example, refrigerator 13 may turn itself on when the temperature inside the refrigerator becomes too high or a base board heater turns on when the air temperature surrounding it drops below a preset level. Each of these active appliances or loads 10 illustrated in FIG. 1 will have a timer condition indicated as a "minimum on" time (FIGS. 3A, 3B and 3C) assigned to the load 10. This condition is determined by the length of time the load 10 requires to satisfactorily complete its initial operation. For example, the refrigerator 14 will need a "minimum on" time to initiate effective refrigeration, such "minimum on" time being that period of time that the compressor requires to initiate proper compression of fluid to commence the actual cooling process. This period is typically five(5) minutes for large refrigeration units with less time for smaller refrigeration units. In respect of other loads, the time period will depend on the operating characteristics of the devices to which they are connected. If the demand period is fifteen(15) minutes as previously set out, the "maximum off" time period is defined by the demand period minus the "minimum on" time period, or ten(10) minutes for a large refrigeration unit.

Various of the active appliances or loads 10 illustrated in FIG. 1 will have a timer condition indicated as "minimum off" time assigned to the load 10. This condition is determined by the length of time the load 10 requires to satisfactorily complete its total off condition. For example, refrigerator 14 will need a "minimum off" time to effectively complete fluid to air pressure equilibrium, such "minimum off" time being that period the compressor requires to complete proper decompression of fluid so that when the compressor begins operation again, it does so under a no-load condition thus increasing the life of the compressor. This time period is typically three(3) minutes. In respect of other loads, the time period will depend on the operating characteristics of the devices to which they are connected. If the demand period is fifteen (15) minutes as previously set forth, the "maximum on" time period is defined by the demand period minus the "minimum off" time period or twelve(12) minutes.

Other timing variables particularly related to reducing demand and relating to the application of the invention are defined and as applicable as follows:

"Device Off Start Minute". This defines the minute into the demand interval that the device is unconditionally turned off.

"Device Off Time". This defines the duration in minutes of the time that the device is actually turned off.

"Device On Time". This defines the minimum amount of time in minutes that a device needs to be turned on before allowing it to go off.

"Peak Demand Monitor Start Minute". This defines the minute into the interval that the usage is compared with a threshold. If such threshold is exceeded, the operation of the device will be terminated.

"Peak Demand Threshold". This defines the maximum interval usage allowed during any interval. The value is calculated based on the average profile usage data gathered from previous billing information.

Following the initial operation of the appliances 10, various of the appliances 10 may be assigned different modes of operation as seen in FIG. 4. A standby mode 33 may be assigned to the toaster 15 which is thereby used when actual toast is not in the toaster 15. The standby and sleep modes are associated with duty cycles wherein the device is turned off and on at predetermined time periods as previously discussed. A sensor (not illustrated) may be used to detect the present or absence of toast. If toast is not present for a predetermined time period, the sensor will instruct the toaster 15 through the controller 23 to enter the standby mode 33 thus initiating the first duty cycle and drawing less electricity. When toast appears in the toaster 15, the sensor will instruct the toaster 15 through the controller 23 to assume the active or full power mode 34. At the end of the day, the toaster 15 would be turned off.

It should be noted that the "active" mode of operation of a device is an override mode when the normal operation of the device is immediately commenced and the device will no longer be in the standby or sleep mode of operation.

When the motors 21, 22 of walk-in freezer 13 and refrigerator 14 are operated, and with reference to FIG. 2, the capacitor bank 31 will also be utilised thereby to improve the power factor of the motors 21, 22. As the power factor increases, electrical consumption is normally decreased as measured by a thermal demand meter thereby reducing demand and again reducing the cost of electricity to the user.

While the applications described have been associated with electrical consumption, the invention would also be applicable to the flow of gas or other energy sources which could be used, for example, with pizza ovens, steam tables and the like. It typically will take some two and one-half (2½) hours for a pizza oven to reach operating temperature with the result that many businesses will simply leave the pizza oven on at all times drawing gas or heating oil so that the oven is ready to produce food when required. A standby mode for gas flow into the pizza oven using a duty cycle in accordance with the invention could be accommodated by the use of a solenoid valve driven appropriately by a controller which would allow the pizza oven to assume the standby mode with a reduced temperature while still allowing the oven to reach operating temperature in an appropriate period. A timer is contemplated to be connected to the solenoid valve allowing a reduction in the amount of gas to be burned. Likewise, gas could be monitored for use in steam tables where the temperature of the water may be maintained at a somewhat lower temperature during the standby mode of operation.

While each of the devices or plurality of similar devices have been treated independently by the foregoing description, it is also contemplated that certain of the devices could be combined with a single control controlling the mode of operation. For example, toasters and heat lamps for maintaining food temperature could be expected to be in standby modes at the same approximate time. When toast is sensed within the toaster the heat lamp could also assume its active operating mode since the toast would find itself beneath the heat lamp after toasting while awaiting delivery to the customer.

While the invention has been described specifically as being used in association with restaurants, the teachings are clearly applicable to other energy consuming establishments as well as has been previously described and contemplated in the specification.

Many further modifications will readily occur to those skilled in the art to which the invention relates and the specific embodiments described should be taken as illustrative of the invention only and not as limiting its scope as defined in accordance with the accompanying claims.

I claim:

1. An energy management system to monitor energy requirements for a plurality of loads, said system comprising a controller operably connected to said loads for monitoring energy consumed by and controlling the operation of said loads, said controller designating one of at least two modes of operation for each of said loads, one of said modes of operation being an active mode wherein said energy consumed by said load is at a first value and one of said modes of operation being a standby mode wherein said power consumed by said load is at a second value, said mode of operation of said load being said standby mode when said energy requirements of said load, during operation, are relatively less, said controller changing said standby mode to said active mode when said energy requirements of said load, during operation, are relatively high.

2. Energy management system as in claim 1 wherein said controller initiates a minimum on time period for at least one of said loads operably connected to said controller following the commencement of operation of said one load, said controller initiating a must start time period for a further one of said loads operably connected to said controller, said further one of said loads commencing operation upon the expiration of said minimum on time period for said one load.

3. Energy management system as in claim 1 wherein said operating modes further include a sleep mode, said sleep mode drawing less energy than said active or standby modes.

4. Energy management system as in claim 3 wherein said standby and sleep modes are first and second duty cycles, respectively, said load drawing energy for a first predetermined time period during said first duty cycle and said load drawing energy for a second predetermined time period during said second duty cycle, said first predetermined time period being greater than said second predetermined time period.

5. Energy management system as in claim 1 wherein said standby mode is a first duty cycle, said load drawing energy for a predetermined time period during said first duty cycle.

6. Energy management system as in claim 1 and further comprising a sensor to initiate said active or standby modes of operation.

7. Energy management system as in claim 6 wherein said sensor may be one of optical, humidity, level, motion, position, pressure, proximity, temperature, flow or weight type sensors.

8. Energy management system as in claim 1 wherein at least one of said plurality of loads includes a motor, said system further comprising a capacitance bank operably connected to said motor, said capacitance bank providing adjustable or fixed capacitance to said motor and being operable to increase the power factor of said motor during operation of said motor.

9. Energy management system to monitor the power requirements for a plurality of loads, said system comprising a controller operably connected to said loads for monitoring the energy consumed by and controlling the operation of said loads, said controller designating one of at least two modes of operation for each of said loads, said modes of operation being an active mode wherein said energy consumed by said load is at a first value and a standby mode wherein said energy consumed by said load is at a second value, said first value being higher than said second value, said controller further being operably connected to a sensor for sensing the intended energy consumption of said loads, said sensor determining said mode of operation of said loads, said sensor designating said active mode of said load when said power requirements are relatively high, said sensor designating said standby mode of said load when said power requirements are relatively low.

10. Energy management system as in claim 9 wherein at least one of said plurality of loads includes a motor, said system further comprising a capacitance bank operably connected to said motor, said capacitance bank providing adjustable or fixed capacitance to said motor and being operable to increase the power factor of said motor during operation of said motor.

11. Energy management system as in claim 9 wherein said controller further designates a third mode of operation for each of said loads wherein said energy consumed by said load is at a third value, said third mode of operation being a sleep mode, said energy consumed by said load at said third value being lower than said energy consumed by said load at said first value.

12. Energy management system as in claim 11 and further comprising a timer for each of at least two of said plurality of loads, said timer providing a minimum-on time period for said first one of said two loads and a must-start time period for said second one of said two loads, each of said minimum-on and must-start time periods having an expiration, said expiration of said minimum-on time period for said one of said two loads allowing the commencement of operation of said second of said two loads.

13. Energy management system as in claim 12 wherein said timer further provides a maximum-on time period for each of said two loads.

14. Method of conserving energy for a plurality of loads having energy requirements, said method comprising assigning at least two operating modes to at least one of said loads, said first operating mode being an active mode wherein said load draws energy at a first value, said second operating mode being a standby mode wherein said load draws energy at a second value, said first value being higher than said second value, said method further comprising returning said standby mode to said active mode when said power requirements are relatively high and returning said active mode to said standby mode when said power requirements are relatively low.

15. Method of conserving energy as in claim 14 and further comprising assigning a third operating mode to said one of said loads, said third operating mode being a sleep mode wherein said load draws energy at a third value, said third value being less than said first and second values.

16. Method of conserving energy as in claim 15 wherein at least one of said plurality of loads includes a motor associated with a motor driven appliance and further comprising providing a capacitance bank operably associated with said motor for increasing the power factor of said motor of said motor driven appliance.

17. Method as in claim 14 and further comprising operably connecting a sensor to said one of said loads, said sensor determining said operating mode of said one load.

18. Method as in claim 17 and further comprising operably connecting a timer to at least two of said plurality of loads, said timer providing a minimum-on time period and a must-start time period for each of said two loads, each of said minimum-on and must-start time periods having an expiration, said expiration of said minimum-on time period for one of said two loads allowing the commencement of operation of said other of said two loads prior to said expiration of said must start time period for said other load.

19. Method as in claim 18 wherein said timer further provides a maximum-on time period for each of said two loads.

* * * * *